United States Patent
Lee et al.

(10) Patent No.: US 8,780,286 B2
(45) Date of Patent: Jul. 15, 2014

(54) THREE DIMENSIONAL IMAGE DISPLAY DEVICE

(75) Inventors: Jun Pyo Lee, Asan-si (KR); Se Huhn Hur, Yongin-si (KR); Jae Woo Jung, Cheonan-si (KR); Bong Im Park, Asan-si (KR); Ik Hyun Ahn, Asan-si (KR); Kang-Min Kim, Seoul (KR); Jung-Won Kim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 354 days.

(21) Appl. No.: 13/189,209

(22) Filed: Jul. 22, 2011

(65) Prior Publication Data

US 2012/0127383 A1    May 24, 2012

(30) Foreign Application Priority Data

Nov. 19, 2010    (KR) .......................... 10-2010-0115668

(51) Int. Cl.
  *G02F 1/1335*    (2006.01)
  *H04N 13/04*    (2006.01)

(52) U.S. Cl.
  USPC .................................. 349/15; 349/96; 348/51

(58) Field of Classification Search
  USPC ............................. 349/15, 96–98; 348/42–60
  See application file for complete search history.

(56) References Cited

U.S. PATENT DOCUMENTS

| 5,963,371 A | 10/1999 | Needham et al. |
|---|---|---|
| 8,279,395 B2 * | 10/2012 | Chen .............................. 349/180 |
| 2008/0062259 A1 | 3/2008 | Lipton et al. |
| 2009/0066863 A1 | 3/2009 | Chen |
| 2009/0167845 A1 | 7/2009 | Khan |

FOREIGN PATENT DOCUMENTS

| JP | 11-098537 | 4/1999 |
|---|---|---|
| JP | 11-289557 | 10/1999 |
| JP | 2010-004511 | 1/2010 |
| KR | 1020020004296 | 1/2002 |
| KR | 100754773 | 8/2007 |
| KR | 1020090101630 | 9/2009 |
| KR | 1020090103968 | 10/2009 |
| KR | 1020100111082 | 10/2010 |
| KR | 1020100122661 | 11/2010 |
| KR | 1020110027538 | 3/2011 |

* cited by examiner

*Primary Examiner* — Dung Nguyen
(74) *Attorney, Agent, or Firm* — F. Chau & Associates, LLC

(57) ABSTRACT

A three-dimensional image display device includes a display and a polarization switching panel. The display includes a signal transmitter, and is configured to alternately display a left eye image and a right eye image. The polarization switching panel includes a signal receiver, an upper substrate, an upper electrode disposed on the upper substrate, a lower substrate, and a lower electrode disposed on the lower substrate. The signal transmitter and the signal receiver are synchronized by a 3D synchronization signal.

19 Claims, 7 Drawing Sheets

THREE DIMENSIONAL IMAGE DISPLAY DEVICE

CROSS-REFERENCE TO RELATED APPLICATION

This application claims priority under 35 U.S.C. §119 to Korean Patent Application No. 10-2010-0115668 filed on Nov. 19, 2010, the disclosure of which is incorporated by reference herein in its entirety.

BACKGROUND

1. Technical Field

A three-dimensional image display device is provided.

2. Discussion of the Related Art 3D image display technology uses binocular parallax to allow for the perception of a three-dimensional effect of objects appearing on a display at a short distance. Using binocular parallax, different 2D images are transmitted to the left eye and the right eye. When the image transmitted to the left eye (hereinafter referred to as the "left eye image") and the image transmitted to the right eye (hereinafter referred to as the "right eye image") are transmitted to the brain, the left eye image and the right eye image are perceived as a three-dimensional image having depth.

A three-dimensional image display device using binocular parallax may be classified as a stereoscopic display device or an autostereoscopic display device. A stereoscopic display device uses shutter glasses or polarized glasses to achieve a three-dimensional effect. An autostereoscopic display device utilizes a lenticular lens and a parallax barrier arranged in the display device to achieve a three-dimensional effect without the use of shutter glasses or polarized glasses.

When shutter glasses are utilized, the left eye image and the right eye image are separately and continuously output, and the left eye shutter and the right eye shutter of the shutter glasses are selectively opened and closed. As a result, the user perceives three-dimensional images on the three-dimensional image display device. The shutter glasses may switch between a 2D mode and a 3D mode without a loss of data. However, due to the cost of shutter glasses, they may not be suitable for a public display intended to be viewed by a large number of people.

When polarized glasses are utilized, a polarization switching panel or a patterned retarder are additionally attached to a common LCD panel. Since polarized glasses cost less to manufacture than shutter glasses, they may be more suitable for public display. However, because the polarization switching panel and the patterned retarder require a process of patterning electrodes and a process of permanently attaching the polarization switching panel or the patterned retarder to the display device, the overall manufacturing cost may increase. Further, a three-dimensional image display device utilizing polarized glasses may not be suitable for use in the home as a result of the increased cost of manufacturing the polarization switching panel or the patterned retarder.

SUMMARY

An exemplary embodiment of the present invention includes a three-dimensional image display device including a display and a polarization switching panel. The display includes a signal transmitter, and is configured to alternately display a left eye image and a right eye image. The polarization switching panel includes a first signal receiver, an upper substrate, an upper electrode disposed on the upper substrate, a lower substrate, and a lower electrode disposed on the lower substrate. The signal transmitter and the first signal receiver may be synchronized by a 3D synchronization signal.

In an exemplary embodiment, the upper electrode and the lower electrode may not be patterned.

In an exemplary embodiment, the upper electrode and the upper substrate may have a substantially similar shape to each other, and the lower electrode and the lower substrate may have a substantially similar shape to each other.

In an exemplary embodiment, the polarization switching panel is configured to convert a light emitted from the display having linear polarization to a light having left circular polarization or a light having right circular polarization.

In an exemplary embodiment, a liquid crystal layer may be disposed between the lower electrode and the upper electrode.

In an exemplary embodiment, liquid crystals in the liquid crystal layer may be aligned at about +45 degrees or about −45 degrees with respect to the light emitted from the display, in response to a voltage being applied to the upper electrode and the lower electrode.

In an exemplary embodiment, the 3D synchronization signal may be synchronized with a voltage being applied to the upper electrode and the lower electrode.

In an exemplary embodiment, the polarization switching panel may be detachable.

In an exemplary embodiment, an operation frequency of the display may be at least about 240 Hz.

In an exemplary embodiment, the 3D synchronization signal may include identification information corresponding to the polarization switching panel.

In an exemplary embodiment, the three-dimensional image display device may further include a shutter member including a left eye shutter and a right eye shutter.

In an exemplary embodiment, the shutter member may include a second signal receiver, and the signal transmitter and the second signal receiver may be synchronized by the 3D synchronization signal.

In an exemplary embodiment, the 3D synchronization signal may be synchronized with an open timing of the shutter member or a closed timing of the shutter member.

In an exemplary embodiment, the 3D synchronization signal may include identification information corresponding to the shutter member.

In an exemplary embodiment, the 3D synchronization signal may include identification information corresponding to the polarization switching panel.

In an exemplary embodiment, the display device may include a backlight unit, and the display may be configured to turn off the backlight unit while displaying a predetermined gray image during a period between the left eye image and the right eye image.

In an exemplary embodiment, the display may be one of a liquid crystal display, an organic light emitting diode display, a plasma display panel, or an electrophoretic display.

In an exemplary embodiment, the predetermined gray image may be black.

According to an exemplary embodiment of the present invention, a method for displaying a three-dimensional image includes alternately displaying a left eye image and a right image, transmitting a 3D synchronization signal to a first signal receiver disposed on a polarization switching panel and a second signal receiver disposed on a shutter member, converting linear polarization into left circular polarization by the polarization switching panel and opening a left eye shutter of the shutter member, concurrently, based on the 3D synchronization signal, and converting linear polarization into right circular polarization by the polarization switching panel and opening a right eye shutter of the shutter member, concurrently, based on the 3D synchronization signal.

In an exemplary embodiment, the 3D synchronization signal includes information corresponding to the first and second signal receivers.

In an exemplary embodiment, a backlight of a display device is turned off while displaying a predetermined gray image during a period between the left eye image and the right eye image.

DETAILED DESCRIPTION OF THE EXEMPLARY EMBODIMENTS

Figure 1:
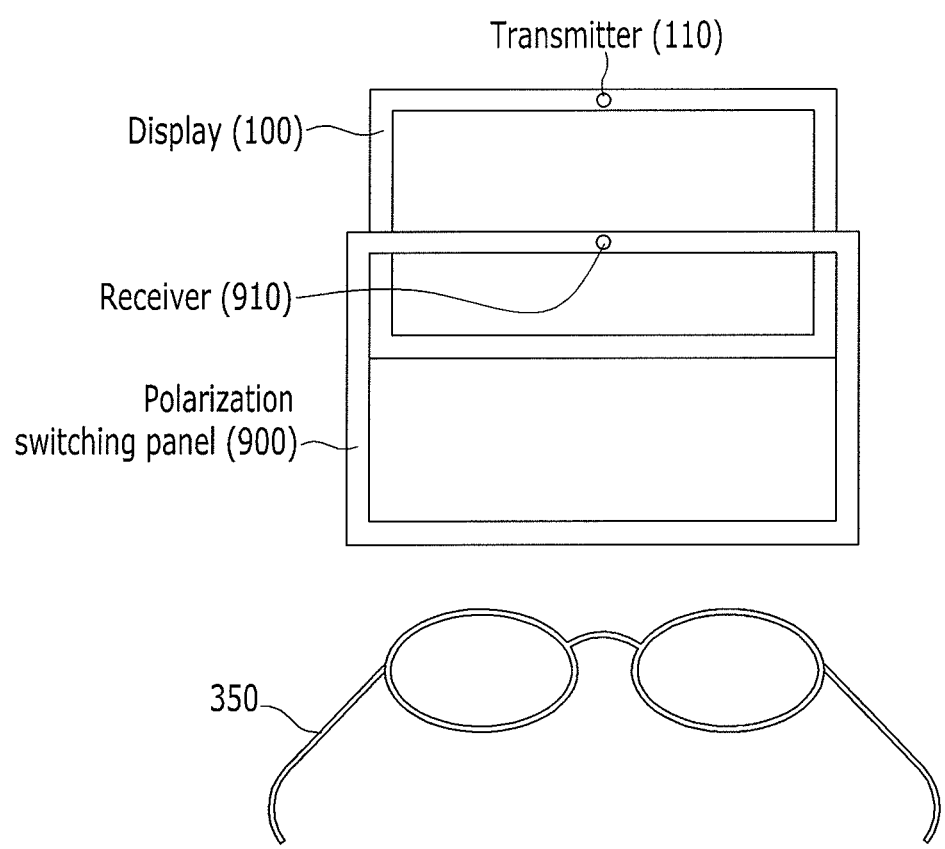
FIG. 1 is a diagram schematically showing a three-dimensional image display device according to an exemplary embodiment of the present invention.

Exemplary embodiments of the present invention will be described more fully hereinafter with reference to the accompanying drawings. Like reference numerals refer to like elements throughout the accompanying drawings.

Hereinafter, a three-dimensional image display device according to an exemplary embodiment of the present invention will be described in detail with reference to FIGS. 1 to 7.

Figure 2:
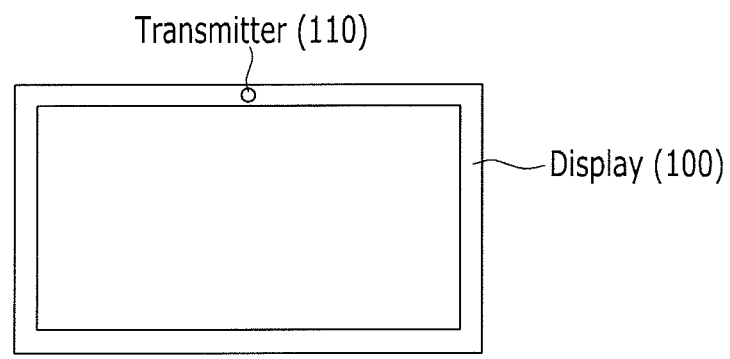
FIG. 2 is a diagram schematically showing a three-dimensional image display device according to an exemplary embodiment of the present invention.
Figure 2:
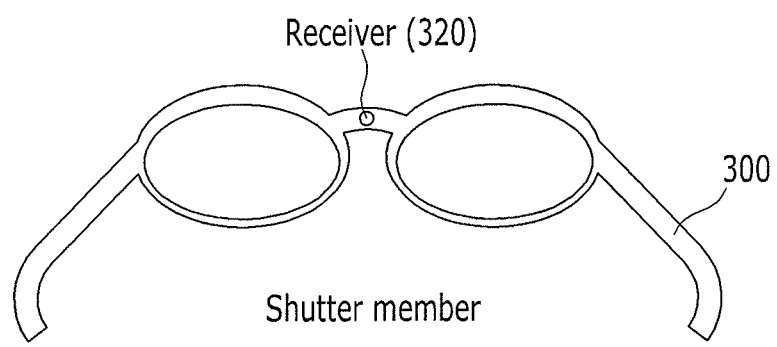
Figure 3:
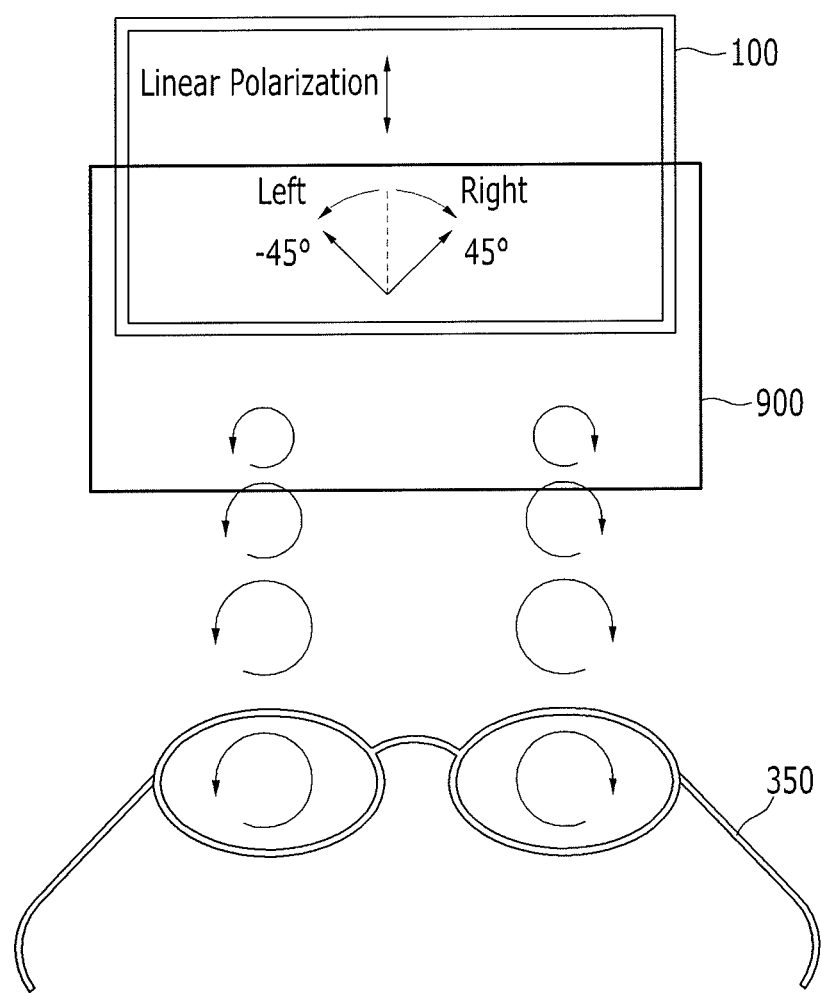
FIG. 3 is a diagram schematically showing the operation of a three-dimensional image display device according to an exemplary embodiment of the present invention.
Figure 4:
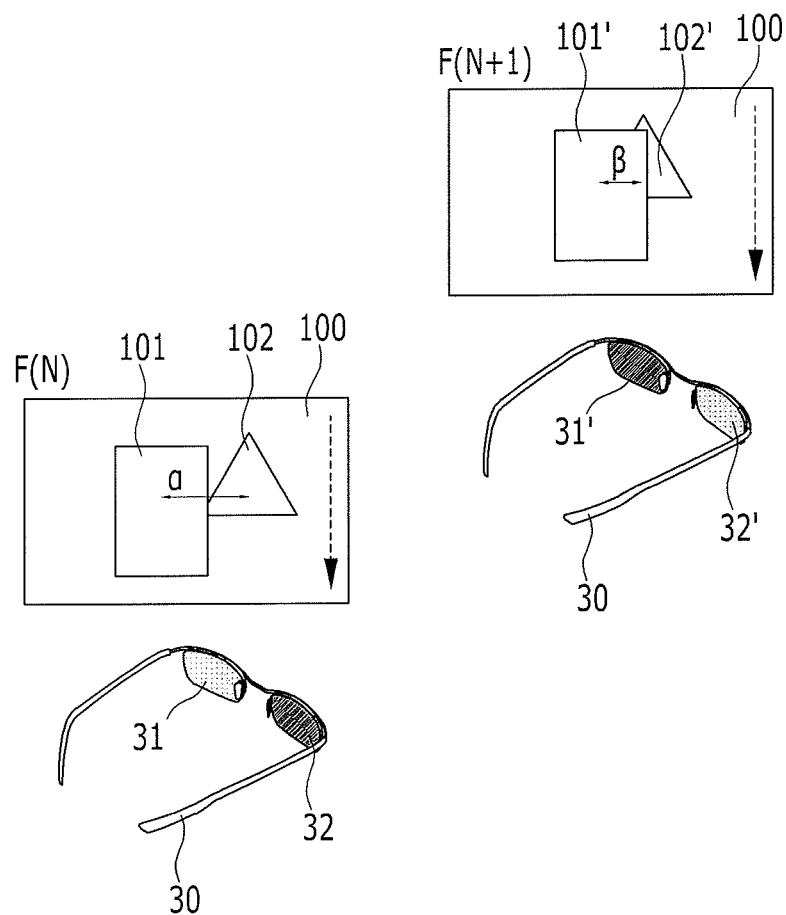
FIG. 4 is a diagram schematically showing the operation of a three-dimensional image display device according to an exemplary embodiment of the present invention.
Figure 5:
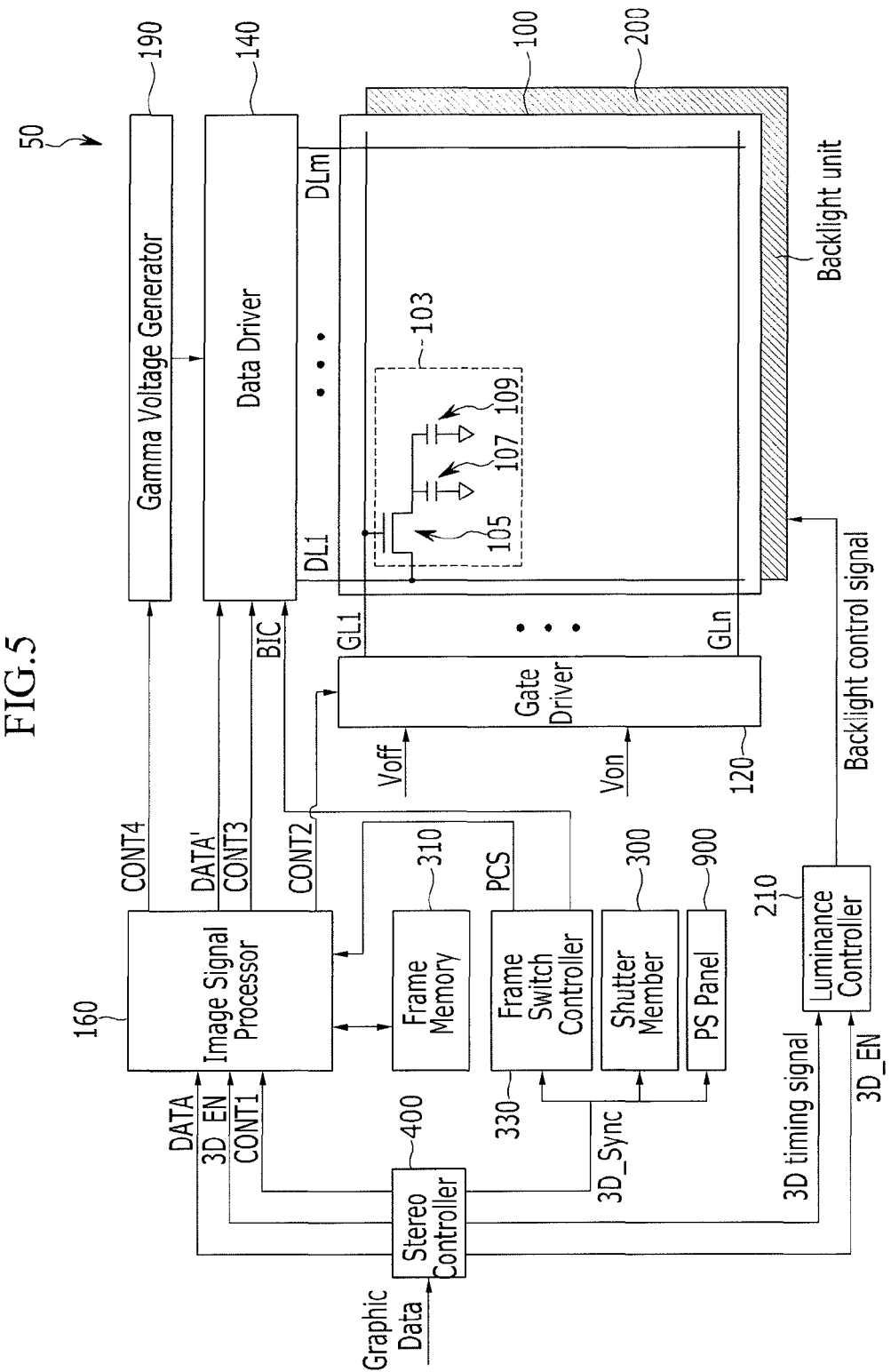
FIG. 5 is a diagram schematically showing a three-dimensional image display device according to an exemplary embodiment of the present invention.
Figure 6:
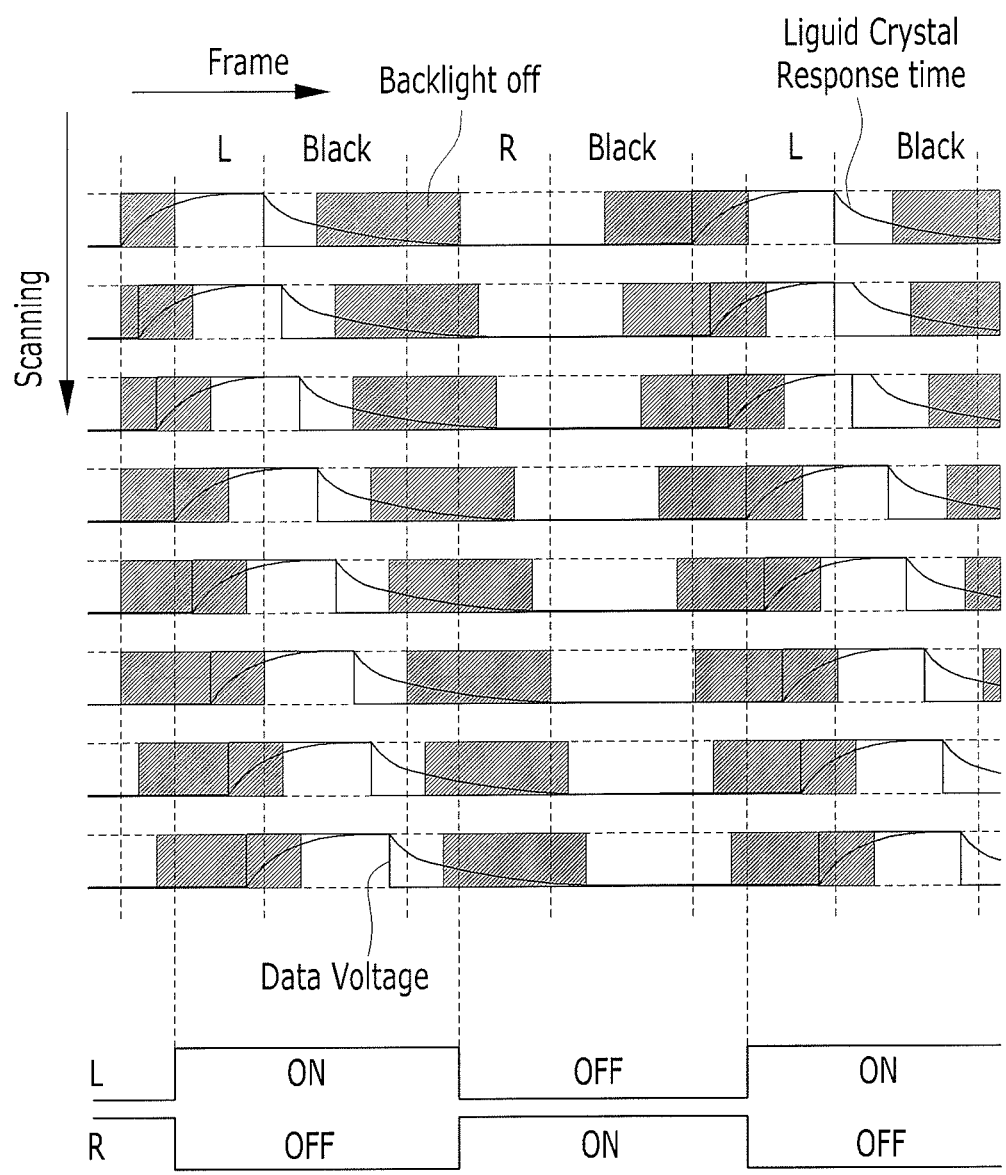
FIG. 6 is a diagram schematically showing the operation timing of a three-dimensional image display device according to an exemplary embodiment of the present invention.
Figure 7:
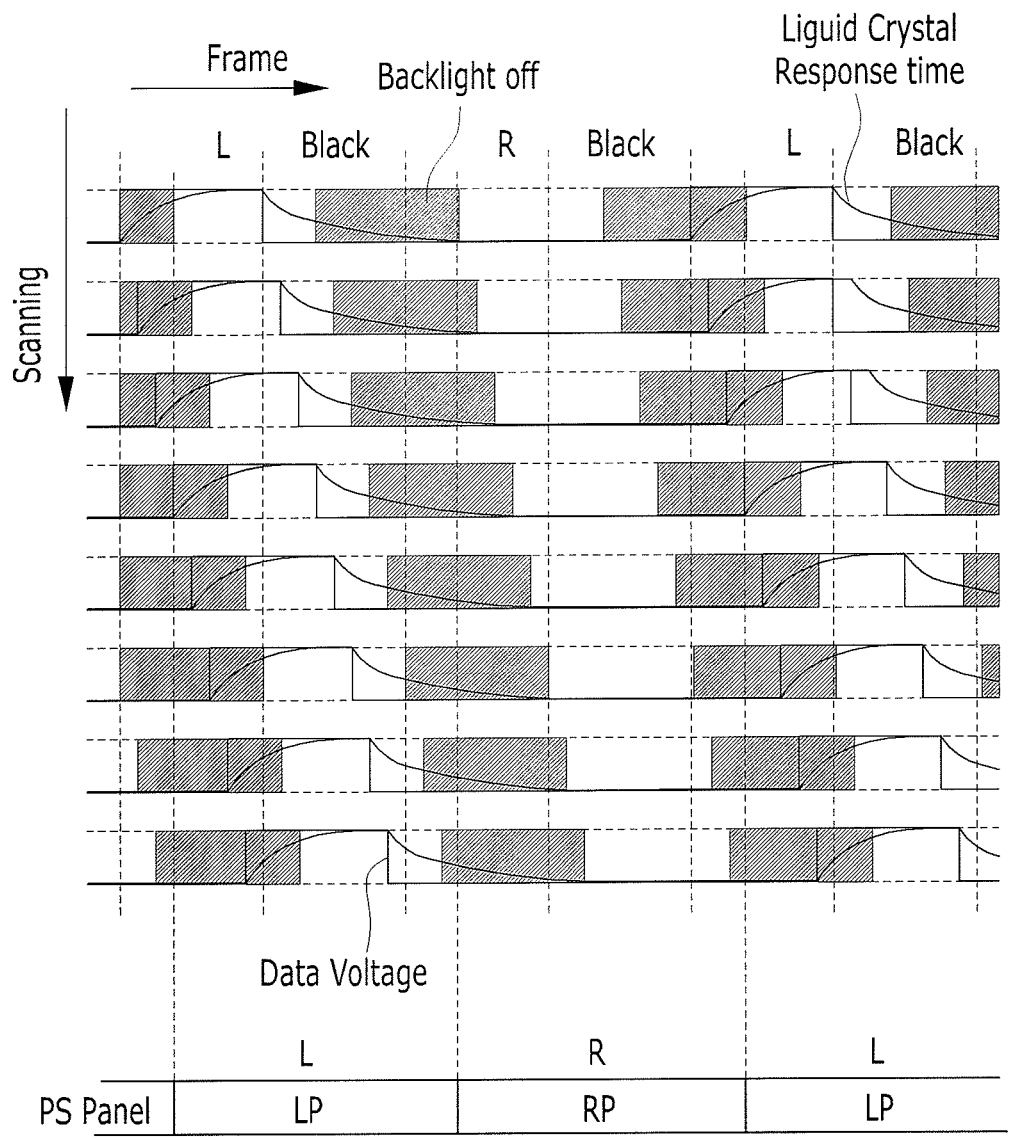
FIG. 7 is a diagram schematically showing the operation timing of a three-dimensional image display device according to an exemplary embodiment of the present invention.

FIGS. 1 and 2 are diagrams schematically showing a three-dimensional image display device according to an exemplary embodiment of the present invention. FIG. 3 is a diagram schematically showing the operation of a three-dimensional image display device according to an exemplary embodiment of the present invention. FIGS. 4 and 5 are diagrams schematically showing the operation of a three-dimensional image display device according to an exemplary embodiment of the present invention. FIGS. 6 and 7 are diagrams schematically showing the operation timing of a three-dimensional image display device according to an exemplary embodiment of the present invention.

A display 100 may include, but is not limited to, a liquid crystal display, an organic light emitting diode display, a plasma display panel, or an electrophoretic display. For example, when the display 100 is a liquid crystal display, it may have an operation frequency of about 240 Hz or more.

Referring to FIG. 1, a three-dimensional image display device may include the display 100 including a signal transmitter 110, and a polarization switching panel 900 including a signal receiver 910. The polarization switching panel 900 may be detachable, and a separating process of attaching the polarization switching panel may not be required. Further, the three-dimensional image display device may include polarization glasses 350.

Referring to FIG. 2, the three-dimensional image display device may include the display 100 including the signal transmitter 110, and a shutter member 300 including a signal receiver 320.

The three-dimensional image display device may include one display 100 that may be used with both the shutter member 300 and the polarization glasses 350. For example, the shutter member 300 may be used when a small number of people watch the display 100 at a small location (e.g., at home), and the polarization glasses 350 may be used when a large number of people watch the display 100 at a large location (e.g., a public place). When using the polarization glasses 350, the polarization switching panel 900 is installed on the three-dimensional display device.

The signal transmitter 110 and the signal receivers 910 and 320 may transmit and receive 3D synchronization signals. For example, the left eye shutter or the right eye shutter of the shutter member 300 may be opened or closed based on the 3D synchronization signals, and the polarization switching panel 900 may switch left eye circular polarization and right eye circular polarization of the polarization glasses 350 based on the 3D synchronization signals. The signal transmitter 110 and the signal receivers 910 and 320 may communicate using a wireless communication method such as, for example, infrared.

The 3D synchronization signals may include identification information corresponding to the shutter member 300 and the polarization switching panel 900. Accordingly, the switching timing of the shutter member 300 and the polarization switching panel 900 may be automatically adjusted based on specific characteristics of the devices. As a result, image quality may be improved by taking the characteristics of the shutter member 300 and the polarization switching panel 900 into consideration. The polarization switching panel 900 may include an upper substrate, an upper electrode on the upper substrate, a lower substrate, and a lower electrode on the lower substrate. A liquid crystal layer may be disposed between the upper electrode and the lower electrode. The polarization switching panel 900 may not include a polarizer. The upper electrode and the lower electrode are not patterned.

Referring to FIG. 3, the polarization switching panel 900 may convert linear polarization from the display 100 into left and right circular polarization, and a left eye image and a right eye image may be separated through the polarization glasses 350. As a result, a three-dimensional effect may be created.

Referring to FIG. 3, liquid crystals in the liquid crystal layer may be aligned at about +45 degrees or about −45 degrees with respect to the linear polarization direction of the emitted light of the display 100, based on whether a voltage is applied. The liquid crystal layer may include, but is not limited to, a liquid crystal of a twisted nematic (TN) mode, a liquid crystal of a vertically aligned (VA) mode, or a liquid crystal of an electrically controlled birefringence (ECB) mode.

Referring to FIG. 4, the shutter member 300 may include shutter glasses 30 having the shape of traditional glasses, but is not limited thereto. For example, the shutter member 300 may include mechanical shutter glasses (e.g., goggles) or optical shutter glasses. The shutter glasses 30 have right eye shutters 32 and 32' and left eye shutters 31 and 31', which alternately block light at a predetermined cycle set by the display 100. The right eye shutter may be closed 32 or open 32', and the left eye shutter may be open 31 or closed 31'. For example, the left eye shutter may be closed while the right eye shutter is open, and the right eye shutter may be closed while the left eye shutter is open. Further, both the left eye shutter and the right eye shutter may be open or closed at the same time.

The shutters of the shutter glasses 30 may be formed using technologies that are used for liquid crystal displays, organic light emitting diode displays, or electrophoretic displays, but is not limited thereto. For example, each shutter may include two transparent conductive layers and a liquid crystal layer disposed between the two conductive layers. A polarization film may be disposed on a surface of the conductive layer. The liquid crystals in the liquid crystal layer are rotated by a voltage applied to the shutter, and the shutter may be opened or closed based on the rotation of the liquid crystals.

For example, the left eye images 101 and 102 are output on the display 100, the left eye shutter 31 of the shutter glasses 30 is opened to transmit light, and the right eye shutter 32 of the shutter glasses 30 is closed to block light. Further, the right eye images 101' and 102' are output on the display 100, the right eye shutter 32' of the shutter glasses 30 is opened to transmit light, and the left eye shutter 31' is closed to block light. Therefore, the left eye image is recognized by only the left eye for a predetermined time, and the right eye image is subsequently recognized by only the right eye for a predetermined time. As a result, a three-dimensional image having an appearance of depth is recognized based on the difference between the left eye image and the right eye image.

The image recognized by the left eye is an image in which the first left eye image 101, which is a quadrangle, and the second left eye image 102, which is a triangle, are separated from each other by a distance α. The image recognized by the right eye is an image in which the first right eye image 101', which is a quadrangle, and the second right eye image 102', which is a triangle, are separated from each other by a distance β. α and β may be different values. When the distances between the images recognized by both eyes are different from each other, as described above, the triangles appear to be positioned behind the quadrangles, and a perception of depth is created. Adjusting the distances α and β between the quadrangles and the triangles results in a change of depth perception.

An image having a predetermined gray value may be displayed between the left eye images 101 and 102 and the right eye images 101' and 102'. For example, a black image, a white image, or a gray image may be displayed between the left eye images 101 and 102 and the right eye images 101' and 102'. Crosstalk between the left eye images 101 and 102 and the right eye images 101' and 102' may be decreased when an image having a predetermined gray value is inserted between the left eye images 101 and 102 and the right eye images 101' and 102' on the entire screen of the display 100.

Referring to FIG. 4, the direction of the arrows shown in the display 100 represents the order that a gate-on voltage may be applied to a plurality of a gate lines extending substantially in a row direction in the display 100. That is, the gate-on voltage may be sequentially applied from the upper gate line to the lower gate line in the display 100.

For example, the display 100 may display the left eye images 101 and 102 as follows. The gate-on voltage may be sequentially applied to the gate lines such that a data voltage is applied to pixel electrodes through thin film transistors connected to corresponding gate lines. The applied data voltage is a data voltage used for displaying the left eye images 101 and 102 (hereinafter referred to as the "left eye data voltage"). The applied left eye data voltage may be stored for a predetermined time by a storage capacitor. Similarly, a data voltage for displaying the right eye images 101' and 102' (hereinafter referred to as the "right eye data voltage") is applied. The applied right eye data voltage may be stored for a predetermined time by a storage capacitor.

Referring to FIG. 5, the display 100 may be a liquid crystal display. The display 100 may include an upper substrate, a lower substrate, and a liquid crystal layer disposed between the upper substrate and the lower substrate. The display 100 may display an image by changing the alignment direction of liquid crystals in the liquid crystal layer using an electric field generated between two electrodes, and adjusting the amount of transmissive light.

Gate lines GL1-GLn, data lines DL1-DLm and pixel electrodes are disposed on the lower substrate of the display 100. The pixel electrodes each include a thin film transistor that controls a voltage applied to the pixel electrodes based on signals supplied by the gate lines GL1-GLn and the data lines DL1-DLm. The pixel electrodes may be, for example, transflective pixel electrodes with a transmissive region and a reflective region. Further, a pixel electrode may include a liquid crystal capacitor and a storage capacitor to store the voltage applied to the pixel electrodes for a predetermined time. For example, one pixel electrode 103 including a thin film transistor 105, a storage capacitor 107, and a liquid crystal capacitor 109 is shown in FIG. 5.

A black matrix, a color filter, and a common electrode may be disposed on the upper substrate, which opposes the lower substrate. Further, at least one of the black matrix, the color filter, and the common electrode may be alternatively formed on the lower substrate. When both the common electrode and the pixel electrode are formed on the lower substrate, at least one of the electrodes may be a linear electrode.

The liquid crystal layer may include, but is not limited to, a liquid crystal of a TN mode, a liquid crystal of a VA mode, or a liquid crystal of an ECB mode.

A polarizer may be attached to the outer surface of the upper substrate and the outer surface of the lower substrate, respectively. Further, a compensation film may be disposed between the substrates and the polarizer.

A backlight unit 200 includes a light source. The light source may be, for example, a fluorescent lamp, such as a CCFL (cold cathode fluorescent lamp), or an LED (light-emitting diode). Further, the backlight unit 200 may include a reflector, a light guide, or a luminance improving film.

Referring to FIG. 5, a display apparatus 50 may include a display 100, a backlight unit 200, a data driver 140, a gate driver 120, an image signal processor 160, a gamma voltage generator 190, a luminance controller 210, a shutter member 300, a frame memory 310, a frame switch controller 330, a stereo controller 400, and a polarization switching panel 900. The stereo controller 400 may receive graphic data and transmit a 3D timing signal and 3D enable signal 3D_EN to the luminance controller 210. The luminance controller 210 may transmit a backlight control signal to the backlight unit 200. The backlight unit 200 may be turned on or off in response to the backlight control signal provided by the luminance controller 210 and the stereo controller 400. The backlight control signal transmitted to the backlight unit 200 may keep the backlight unit 200 on for a predetermined time. For example, the backlight control signal transmitted to the backlight unit 200 may keep the backlight unit 200 on for period equal to a vertical blank, or a predetermined period not including the vertical blank.

The stereo controller 400 may transmit a 3D synchronization signal 3D_Sync to the shutter member 300, the polarization switching panel 900, and the frame switch controller 330. The shutter member 300 and the polarization switching panel 900 may be electrically connected to the stereo controller 400. The shutter member 300 and the polarization switching panel 900 may receive the 3D synchronization signal 3D_Sync by, for example, wireless infrared communication. The shutter member 300 and the polarization switching panel 900 may operate in response to the 3D synchronization signal 3D_Sync or a transformed 3D synchronization signal. The 3D synchronization signal 3D_Sync may include a signal that opens or closes the left eye shutter or the right eye shutter, and a signal that switches the left eye circular polarization and the right eye circular polarization in the polarization switching panel 900. The frame switch controller 330 may transmit control signals PCS and BIC to the image signal processor 160 and the data driver 140.

The stereo controller 400 may transmit display data DATA, a 3D enable signal 3D_EN, and control signal CONT1 to the image signal processor 160. The image signal processor 160 may transmit display data DATA' and control signals CONT2, CONT3, and CONT4 to the display 100 through the gate driver 120, the data driver 140, and the gamma voltage generator 190, in order to display an image on the display 100. The display data DATA may include left eye image data and right eye image data. The gate driver 120 may receive voltages Von and Voff.

Referring to FIG. 6, when gate-on signals are sequentially supplied from the first gate line to the last gate line, the right eye image R may be supplied to the plurality of pixels connected to corresponding gate lines, or the left eye image L may be supplied to the plurality of pixels connected to corresponding gate lines. The right eye shutter may be open (e.g., on) and the left eye shutter may be closed (e.g., off) while the right eye image R is sequentially supplied to the plurality of pixels connected to corresponding gate lines. The left eye shutter may be open (e.g., on) and the right eye shutter may be closed (e.g., off) while the left eye image L is supplied to the plurality of pixels connected to corresponding gate lines.

An image having a predetermined gray value may be input between the input period of the right eye image R and the input period of the left eye image L. The input of this image may be referred to as gray insertion. For example, after the right eye image R is displayed on the display 100, black and white images may be displayed on the entire screen prior to the left eye image L being displayed. The predetermined gray value may include various gray values, and is not limited to black or white. Gray insertion may decrease crosstalk between the right eye image and the left eye image.

Referring to FIG. 6, the response speed of the liquid crystals of the liquid crystal layer may be adjusted based on whether the data voltage is applied. Further, the backlight may be turned off in a period of time between supplying the right eye image R and the left eye image L.

Referring to FIG. 7, the operation timing for the data voltage of the display 100, the response speed of the liquid crystals in the liquid crystal layer, and the backlight on/off timing are the same as FIG. 6. Further, the switching timing of the left circular polarization LP and the right circular polarization RP of the polarization switching panel 900 in FIG. 7 is the same as the on/off timing of the shutter member 300 in FIG. 6.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A three-dimensional image display device comprising:
    a display comprising a signal transmitter, wherein the display is configured to alternately display a left eye image and a right eye image; and
    a polarization switching panel mounted to the display and comprising a first signal receiver, an upper substrate, an upper electrode disposed on the upper substrate, a lower substrate, and a lower electrode disposed on the lower substrate,
    wherein the signal transmitter and the first signal receiver are synchronized by a 3D synchronization signal.

2. The three-dimensional image display device of claim 1, wherein:
    the upper electrode and the lower electrode are not patterned.

3. The three-dimensional image display device of claim 1, wherein:
    the upper electrode and the upper substrate have a substantially similar shape with respect to each other, and the lower electrode and the lower substrate have a substantially similar shape with respect to each other.

4. The three-dimensional image display device of claim 1, wherein:
    the polarization switching panel is configured to convert a light emitted from the display having linear polarization to a light having left circular polarization or a light having right circular polarization.

5. The three-dimensional image display device of claim 4, wherein:
    the polarization switching panel comprises a liquid crystal layer disposed between the lower electrode and the upper electrode, and
    liquid crystals in the liquid crystal layer are aligned at about +45 degrees or about −45degrees with respect to the light emitted from the display, in response to a voltage being applied to the upper electrode and the lower electrode.

6. The three-dimensional image display device of claim 4, wherein:
    the 3D synchronization signal is synchronized with a voltage being applied to the upper electrode and the lower electrode.

7. The three-dimensional image display device of claim 1, wherein:
    the polarization switching panel is detachable.

8. The three-dimensional image display device of claim 1, wherein:
    an operation frequency of the display is at least about 240 Hz.

9. The three-dimensional image display device of claim 1, wherein:
    the 3D synchronization signal comprises identification information corresponding to the polarization switching panel.

10. The three-dimensional image display device of claim 1, wherein:
    the display further comprises a backlight unit, and
    the display is configured to turn off the backlight unit while displaying a predetermined gray image during a period between the left eye image and the right eye image.

11. The three-dimensional image display device of claim 10, wherein:
    the predetermined gray image is black.

12. The three-dimensional image display device of claim 1, wherein:
    the display is one of a liquid crystal display, an organic light emitting diode display, a plasma display panel, or an electrophoretic display.

13. The three-dimensional image display device of claim 1, further comprising a shutter member comprising a left eye shutter and a right eye shutter.

14. The three-dimensional image display device of claim 13, wherein the shutter member comprises a second signal receiver, and the signal transmitter of the display is configured to transmit the 3D synchronization signal to the first signal receiver of the polarization switching panel and the second signal receiver of the shutter member.

15. A three-dimensional image display device comprising:
 a display comprising a signal transmitter, wherein the display is configured to alternately display a left eye image and a right eye image;
 a polarization switching panel comprising a first signal receiver, an upper substrate, an upper electrode disposed on the upper substrate, a lower substrate, and a lower electrode disposed on the lower substrate; and
 a shutter member comprising a left eye shutter and a right eye shutter,
 wherein the signal transmitter and the first signal receiver are synchronized by a 3D synchronization signal.

16. The three-dimensional image display device of claim 15, wherein:
 the shutter member comprises a second signal receiver, and the signal transmitter and the second signal receiver are synchronized by the 3D synchronization signal.

17. The three-dimensional image display device of claim 11, wherein:
 the 3D synchronization signal is synchronized with an open timing of the shutter member or a closed timing of the shutter member.

18. The three-dimensional image display device of claim 15, wherein:
 the 3D synchronization signal comprises identification information corresponding to the shutter member.

19. The three-dimensional image display device of claim 18, wherein:
 the 3D synchronization signal further comprises identification information corresponding to the polarization switching panel.

* * * * *